United States Patent
Shingai

(10) Patent No.: US 9,232,098 B2
(45) Date of Patent: Jan. 5, 2016

(54) IMAGE READING APPARATUS

(71) Applicant: Brother Kogyo Kabushiki Kaisha, Nagoya-shi, Aichi-ken (JP)

(72) Inventor: Hiroyuki Shingai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/448,371

(22) Filed: Jul. 31, 2014

(65) Prior Publication Data

US 2015/0036197 A1    Feb. 5, 2015

(30) Foreign Application Priority Data

Jul. 31, 2013   (JP) .................. 2013-159237

(51) Int. Cl.
*H04N 1/04*   (2006.01)
*H04N 1/00*   (2006.01)

(52) U.S. Cl.
CPC ...... *H04N 1/0057* (2013.01); *H04N 2201/0081* (2013.01); *H04N 2201/04756* (2013.01)

(58) Field of Classification Search
CPC . H04N 1/193; H04N 1/00602; H04N 1/0057; H04N 1/00588; H04N 1/121
USPC ................................. 358/496, 498
See application file for complete search history.

(56) References Cited

U.S. PATENT DOCUMENTS

| | | | | |
|---|---|---|---|---|
| 5,661,571 A | * | 8/1997 | Ijuin et al. | 358/471 |
| 6,801,343 B1 | * | 10/2004 | Sheng | 358/474 |
| 7,079,294 B1 | * | 7/2006 | Nakagawa et al. | 358/496 |
| 7,692,828 B2 | * | 4/2010 | Katayama | 358/498 |
| 7,755,815 B2 | * | 7/2010 | Nakamura et al. | 358/498 |
| 8,508,820 B2 | * | 8/2013 | Honma et al. | 358/498 |
| 2006/0256402 A1 | | 11/2006 | Katayama | |

FOREIGN PATENT DOCUMENTS

| | | |
|---|---|---|
| JP | 2000-004327 A | 1/2000 |
| JP | 2002-190927 A | 7/2002 |
| JP | 3428903 B2 | 7/2003 |
| JP | 2006-345499 A | 12/2006 |
| JP | 3887536 B2 | 2/2007 |
| JP | 4810299 B2 | 11/2011 |

* cited by examiner

*Primary Examiner* — Cheukfan Lee
(74) *Attorney, Agent, or Firm* — Banner & Witcoff, Ltd.

(57) ABSTRACT

An image reading apparatus includes a conveyor configured to convey a sheet along a predetermined conveyance path; a platen a sheet pressing member made of a resin member; spacers provided on both end portions of the sheet pressing member in a width direction, wherein each of the spacers protrudes toward a platen side, a tip end of the spacer in the protrusion direction contacting the platen at positions out of a reading range of a reading unit in the width direction to secure a gap between the sheet pressing member and a platen; and a protruding portion provided on a central portion of the sheet pressing member in the width direction.

5 Claims, 4 Drawing Sheets

IMAGE READING APPARATUS

CROSS-REFERENCE TO RELATED APPLICATION

This application claims priority from Japanese Patent Application No. 2013-159237 filed on Jul. 31, 2013, the entire subject matter of which is incorporated herein by reference.

TECHNICAL FIELD

This disclosure relates to an image reading apparatus.

BACKGROUND

In an image reading apparatus having an automatic document feeder (hereinafter, referred to as ADF), a document pressing member is provided in the vicinity of a document read position.

This kind of a document pressing member is disposed at a position on the opposite side of a document conveyance path to contact glass and suppresses a conveyed document from floating up from the contact glass side.

SUMMARY

In the related art, as described above, it is often to use metal document pressing members as document pressing members. However, in general, since the manufacturing costs of metal components are higher than those of resin components, use of metal document pressing members causes the prices of final products to rise. Therefore, it may be difficult to use metal document pressing members, in low-priced products, for example. Meanwhile, if it is possible to use a resin component as a document pressing member, it is possible to suppress the manufacturing cost as compared to a case of using a metal component.

However, this kind of a sheet pressing member needs a length sufficient to press the full width of a sheet in a width direction perpendicular to a sheet conveyance direction, and thus is generally long and thin. Therefore, if this long and thin sheet pressing member is made of a resin component, it is more likely to be bended, twisted, or deformed as compared to a metal component. Especially, since this kind of a sheet pressing member is always biased toward the document side by a biasing member such as a spring, it is more likely to be bended or deformed due to secular change, as compared to a resin component to which any biasing force is not being applied.

For this reason, if the document pressing member is bended or deformed, locally at an unexpected position, a portion of the sheet pressing member may approach or separated from the document side from its position in the design. As a result, only at that position, the contact pressure against a document may increase or decrease. As a result, the balance in contact pressure between a range from the center to one end side of a document in the width direction and a range from the center to the other end side may be lost, whereby the document may be likely to move obliquely.

This disclosure is to provide an image reading apparatus capable of suppressing documents from moving obliquely although the image processing apparatus has a resin component as a document pressing member.

An image reading apparatus of this disclosure includes: a conveyor configured to convey a sheet along a predetermined conveyance path; a platen; a sheet pressing member, which has a shape extending in a width direction perpendicular to both of a sheet conveyance direction of the conveyor and a sheet thickness direction and which is disposed at a position facing the platen with interposing the conveyance path therebetween to contact the sheet conveyed by the conveyor when the sheet passes between the sheet pressing member and the platen; a biasing member configured to bias the sheet pressing member toward the platen; and a reading unit configured to read the image of the sheet at a predetermined reading position, through the platen, when the sheet conveyed by the conveyor passes between the platen and the sheet pressing member. The sheet pressing member is made of a resin member. Spacers are provided on both end portions of the sheet pressing member in the width direction. Each of the spacers protrudes toward the platen, a tip end of the spacer in a protrusion direction of the spacer contacting the platen at positions out of a reading range of the reading unit in the width direction to secure a gap between the sheet pressing member and the platen. A protruding portion is provided on the central portion of the sheet pressing member in the width direction.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, an embodiment of this disclosure will be described using an example.

[Structure of Multi-Function Apparatus]

Figure 1:
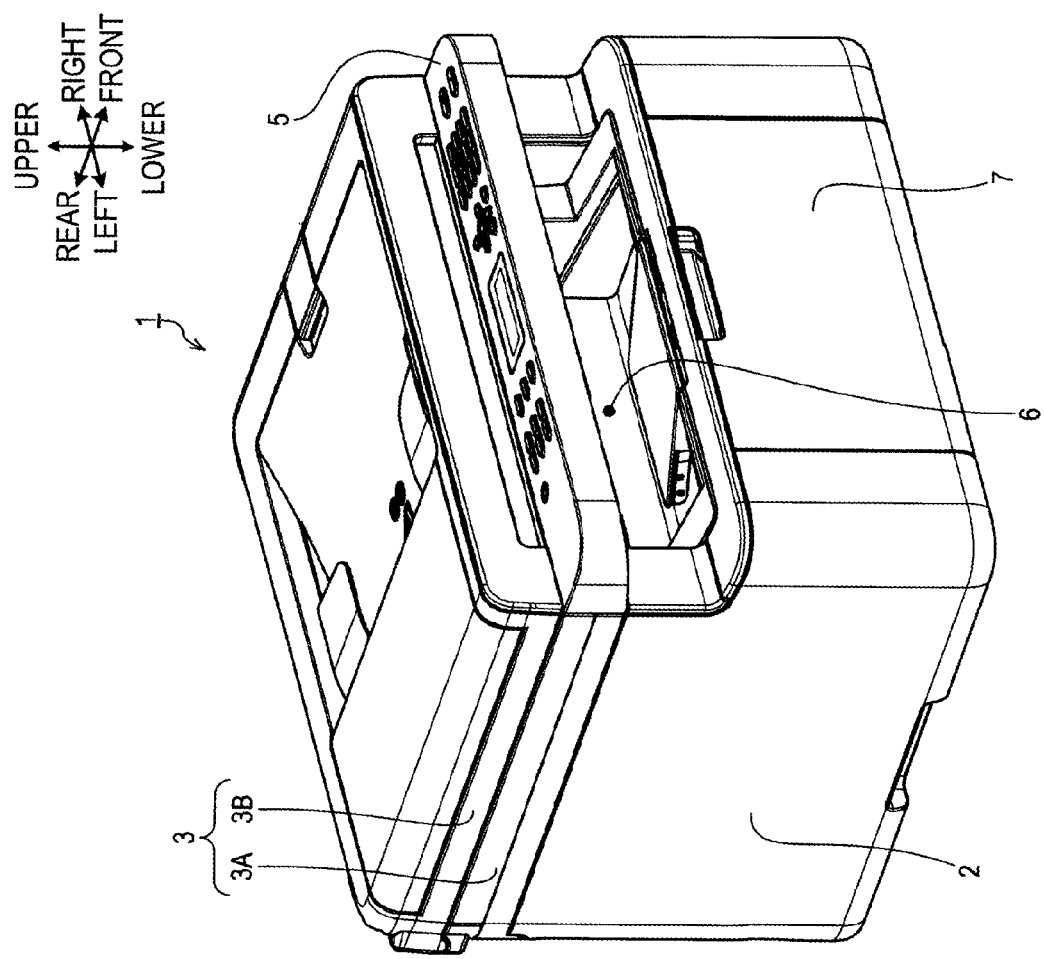
FIG. 1 is a perspective view illustrating a multi-function apparatus.

A multi-function apparatus 1 shown in FIG. 1 has a configuration corresponding to an example of an image reading apparatus and a sheet conveying device of this disclosure. In the following description, the individual units of the multi-function apparatus will be described with reference to directions, that is, the upper side, the lower side, the left side, the right side, the front side, and the rear side shown in the drawings for simply explaining the relative positional relation among the individual units.

The multi-function apparatus 1 includes a lower unit 2, and an upper unit 3 that is mounted on the lower unit 2. The upper unit 3 is assembled with the lower unit 2 so as to be openable and closable, and if the upper unit 3 is closed, an opening formed on the upper surface side of the lower unit 2 is closed by the upper unit 3.

The upper unit 3 includes a flat bed unit (hereinafter, referred to as FB unit) 3A, and a cover unit 3B that covers the upper surface side of the FB unit 3A. The cover unit 3B is assembled with the FB unit 3A so as to be openable and closeable. If the cover unit 3B is closed, the upper surface side of the FB unit 3A is covered by the cover unit 3B.

Inside the lower unit 2, a control unit, an image forming unit, a LAN communication unit, a PSTN communication unit, and the like are provided. At the upper front portion of the lower unit 2, an operation panel 5 which can be operated by a user is provided. An outlet 6 for pick up recording media having been subjected to image forming in the image forming unit is formed below the operation panel 5. A feeding unit 7 for storing recording media to be fed to the image forming unit is provided below the outlet 6.

Figure 2:
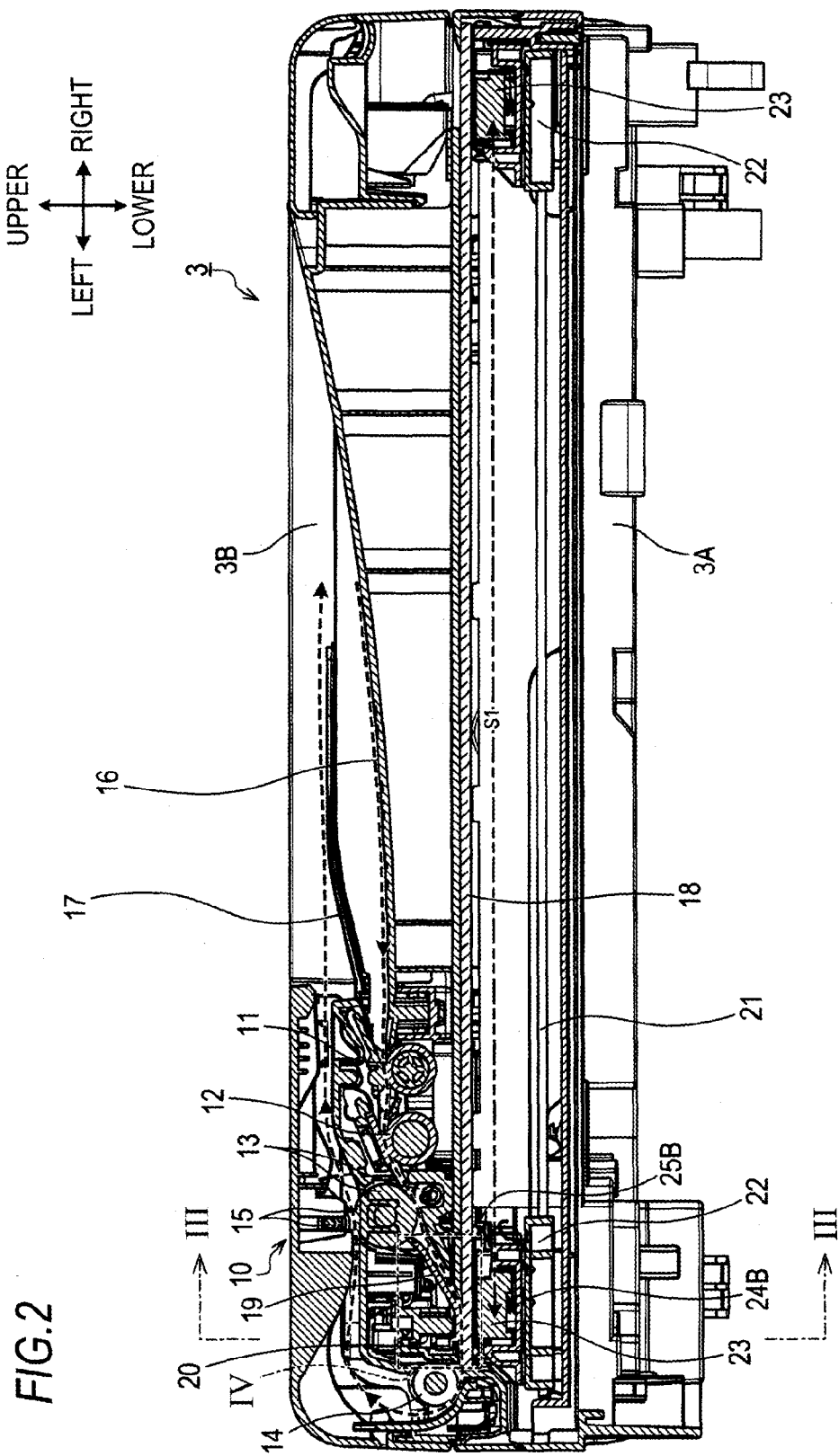
FIG. 2 is a vertical cross-sectional view illustrating the internal structure of a reading unit.

In the upper unit 3, the cover unit 3B includes a conveying unit 10 for conveying documents along a predetermined conveyance path as shown in FIG. 2. The conveying unit 10 includes a feed roller 11, a separation roller 12, a pair of relay rollers 13, a U-turn conveyance roller 14, a pair of discharging rollers 15, and so on. The pair of relay rollers 13 and the pair of discharging rollers 15 share a single roller. At the upper portion of the cover unit 3B, a feed tray 16 and a discharge tray 17 are provided.

Documents mounted on the feed tray 16 are conveyed along a conveyance path shown by a broken line in FIG. 2 and are discharged onto the discharge tray 17. At this time, the documents are sent from the feed tray 16 toward the downstream side in the conveyance direction by the feed roller 11, and then are separated one by one by the separation roller 12. Thereafter, each document is further conveyed toward the downstream side in the conveyance direction by the pair of relay rollers 13 and the U-turn conveyance roller 14, and then is discharged onto the discharge tray 17 by the discharging rollers 15.

On the upper surface side of the FB unit 3A, platen glass 18 (corresponding to an example of a transparent member of this disclosure) is provided, and on the cover unit (3B) side, a document pressing member 19 is provided. At a position between the pair of relay rollers 13 and the U-turn conveyance roller 14, each document which is conveyed along the above described conveyance path passes between the platen glass 18 and the document pressing member 19 while being in contact with the upper surface of the platen glass 18. At this time, the document pressing member 19 is biased toward the platen glass (18) side by a spring 20 (corresponding to an example of a biasing member of this disclosure), thereby suppressing each document passing while being in contact with the upper surface of the platen glass 18 from floating up.

Figure 3:
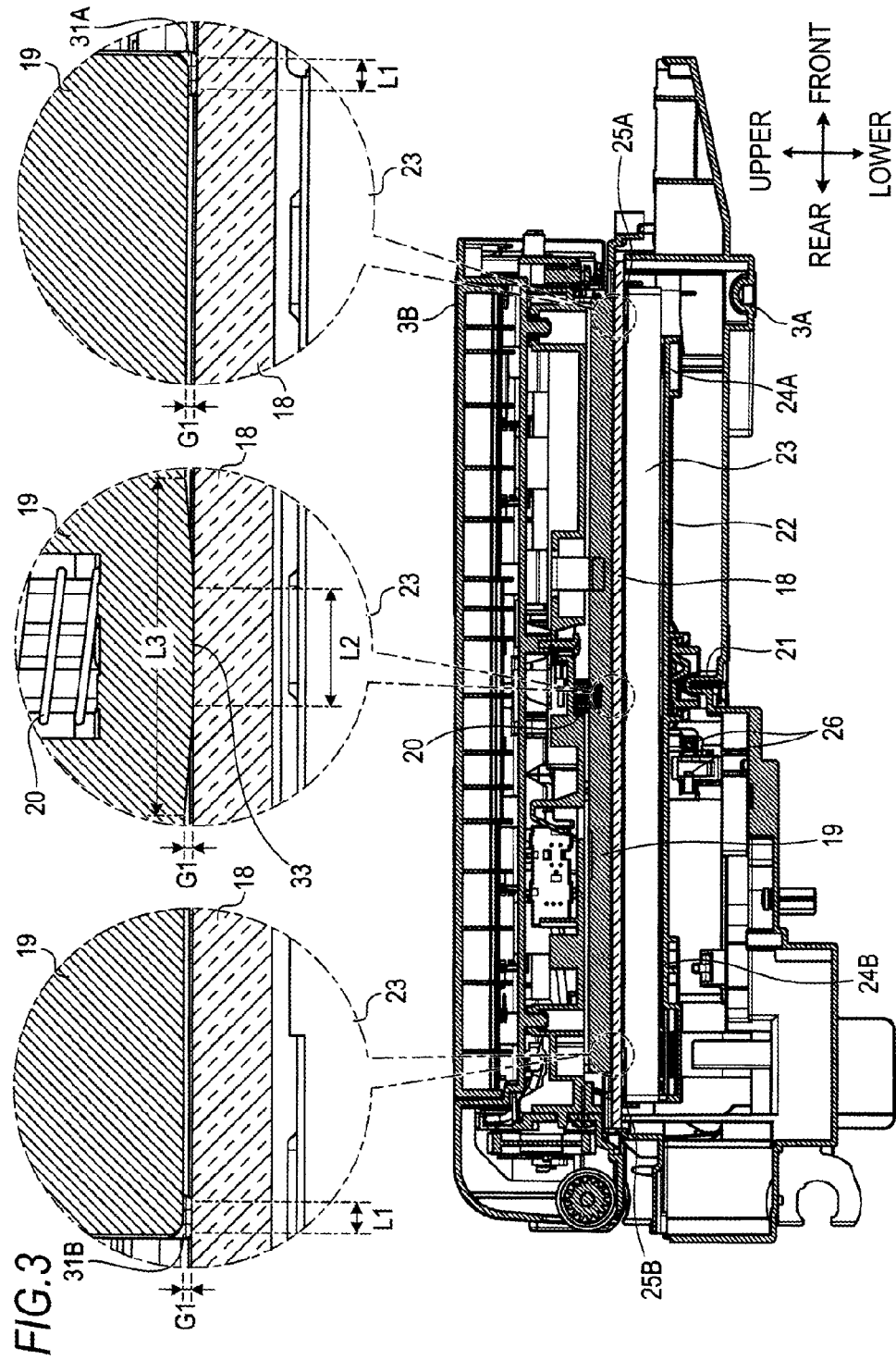
FIG. 3 is a vertical cross-sectional view illustrating a cross section taken along a line III-III of FIG. 2.

As shown in FIGS. 2 and 3, the FB unit 3A includes a guide unit 21, a carriage 22, an image sensor 23 (corresponding to an example of a reading unit of this disclosure), springs 24A and 24B, spacers 25A and 25B, a timing belt 26, and so on. As shown in FIG. 3, the guide unit 21 is formed integrally with the bottom of the resin casing of the FB unit 3A, such that a portion protruding upwardly is extending in the left-right direction.

The carriage 22 is mounted on the guide unit 21, thereby being supported so as to be able to reciprocate in the left-right direction along the guide unit 21. Also, the carriage 22 is connected to the timing belt 26, and reciprocates in the left-right direction according to circulation of the timing belt 26.

In the present embodiment, a contact image sensor (CIS) is used as the image sensor 23. The image sensor 23 is mounted on the carriage 22, and reciprocates together with the carriage 22 in the left-right direction. Also, FIG. 2 shows both a state where the carriage 22 and the image sensor 23 are at the leftmost position and a state where the carriage 22 and the image sensor 23 are at the rightmost position, and the carriage 22 and the image sensor 23 reciprocate between theses two positions, in a direction shown by an arrow S1 in FIG. 2.

As shown in FIG. 3, the springs 24A and 24B are interposed between the image sensor 23 and the carriage 22, and bias the image sensor 23 upwardly. Also, the spacers 25A and 25B are assembled in the vicinities of the front and rear ends of the image sensor 23, and are biased upwardly together with the image sensor 23, thereby coming into contact with the bottom of the platen glass 18. Therefore, while the image sensor 23 reciprocates together with the carriage 22, the spacers 25A and 25B is maintained in a state where they are in contact with the bottom of the platen glass 18, so the image sensor 23 moves while keeping a constant distance from the platen glass 18.

The image sensor 23 includes a plurality of reading elements, which is arranged in the front-rear direction of the present embodiment. Hereinafter, the reading-element arrangement direction (front-rear direction) is also referred to as the main scan direction. In a case of reading the image of a document mounted on the platen glass 18, the image sensor 23 reads the image while moving together with the carriage 22. Also, in a case of reading the image of a document conveyed by the conveying unit 10, the image sensor 23 stops at the leftmost position, specifically, a position facing the document pressing member 19, and then reads the image of the document passing while being in contact with the upper surface of the platen glass 18. When this image reading is performed, the image sensor 23 reads the image of a document while moving relatively with respect to the document in a direction perpendicular to the above described main scan direction. Hereinafter, the relative movement direction perpendicular to the main scan direction will be referred to as the sub scan direction.

[Structure of Document Pressing Member]

In the present embodiment, the document pressing member 19 is made of a rigid resin, which is excellent in slidability (for example, an engineering plastic such as polyacetal resin or polyimide resin). On both end portions in the width direction of the document pressing member 19 (which corresponds to the front-rear direction of the present embodiment and will hereinafter be referred to simply as the width direction), spacers 31A and 31B are provided so as to protrude toward the platen glass (18) side, as shown in the partially enlarged view of FIG. 3.

At positions out of the reading range of the image sensor 23 in the width direction, the leading ends of the spacers 31A and 31B in the protrusion direction abut on the platen glass 18 by ranges of a dimension L1 in the width direction as shown in FIG. 3. Therefore, in the region between the spacers 31A and 31B, a gap G1 between the document pressing member 19 and the platen glass 18 is secured.

However, a protruding portion 33 is formed on the central portion of the document pressing member 19 in the width direction, so as to protrude toward the platen glass (18) side. While the conveying unit 10 does not perform document conveyance, the tip end of the protruding portion 33 in the protrusion direction contacts the platen glass 18 with a range of a dimension L2 in the width direction. Also, a range of a dimension L3 in the width direction protrudes downward from portions, which are positioned on both sides of the corresponding range and at which the gap G1 has been secured.

Further, the above described spring 20 applies a biasing force to the document pressing member 19 at the central portion of the document pressing member 19 in the width direction. Therefore, while a document is being conveyed by the conveying unit 10, the tip end of the protruding portion 33 in the protrusion direction is surely in contact with the document being conveyed by the conveying unit 10, as compared to the portions where the gap G1 has been secured.

Figure 4:
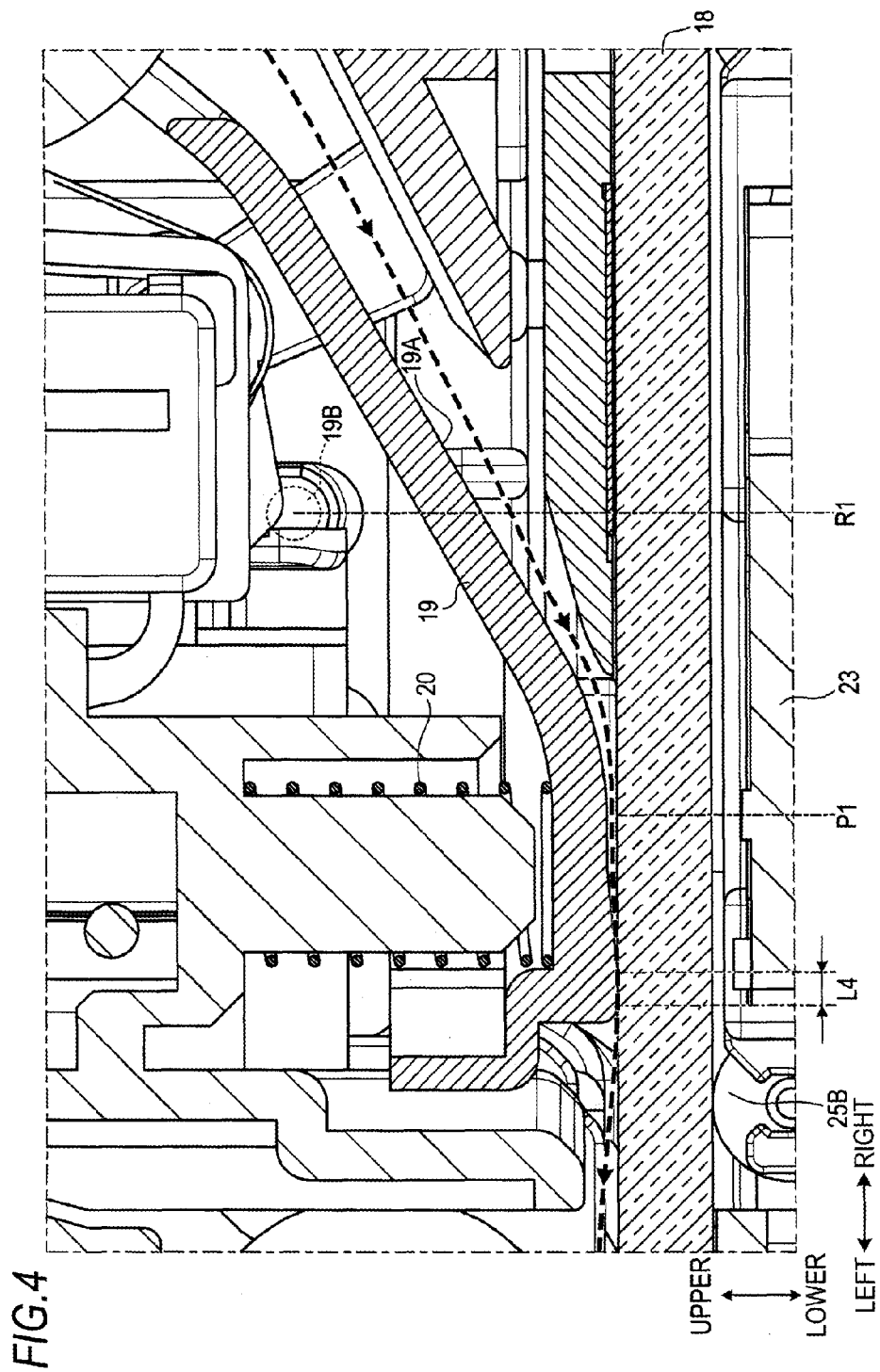
FIG. 4 is an enlarged cross-sectional view of a range IV of FIG. 2.

Also, as shown in FIG. 4, in the document conveyance direction, the protruding portion 33 contacts the platen glass 18 at a position deviated from the reading position P1 of the image sensor 23 toward the downstream side in the document conveyance direction, with a range of a dimension L4.

The document pressing member 19 has a guide surface 19A, which guides the leading end of a document conveyed by the conveying unit 10, to the reading position P1, when the leading end of the document comes into contact with an end portion of the document pressing member 19 positioned on the upstream side in the document conveyance direction. A rotating shaft 19B is provided as a rotation center at a position R1 on the upstream side (the right side in the present embodiment) from the reading position P1 in the document conveyance direction.

The document pressing member 19 is supported such that a portion located on the downstream side (the left side in the present embodiment) from the rotation center (the rotating shaft 19B) in the document conveyance direction (a portion located on the left side from the position R1 in FIG. 4) rotates upwardly around the rotation center.

Therefore, the leading end of a document conveyed from the upstream side in the conveyance direction enters below the document pressing member 19 while being guided by the guide surface 19A, and passes the reading position P1 to come into contact with the protruding portion 33. At this time, since the protruding portion 33 can be displaced upwardly with the document pressing member 19, when the document conveyed toward the downstream side in the conveyance direction comes into contact with the protruding portion 33, the document pressing member 19 escapes upwardly, in response to the frictional force of the document. Therefore, even if the protruding portion 33 comes into contact with the document, an excessive load disturbing the conveyance is not applied to the document.

[Effects]

According to the multi-function apparatus 1 configured as described above, since the spacers 31A and 31B as described above are provided on the document pressing member 19, the document pressing member 19 does not adhere excessively tightly to the platen glass 18, so each document which is conveyed by the conveying unit 10 smoothly passes between the platen glass 18 and the document pressing member 19. Further, since the document pressing member 19 also has the protruding portion 33 as described above, even if the document pressing member 19 is slightly bended or deformed in case that the document pressing member 19 is made a resin member, the contact pressure between the document pressing member 19 and document is high at the central portion where there is the protruding portion 33. Therefore, even if the document pressing member 19 is made of a resin member more likely to be deformed than a metal member, the document pressing member 19 can suppress the contact pressure between the document pressing member 19 and each document from increasing at a position deviated from an expected position due to bending or deformation of the document pressing member 19, and can prevent or suppress oblique movement of a document.

Also, as apparent from the above description, the protruding portion 33 is provided at the central portion of the document pressing member 19 in the width direction. Here, the central portion may refer to a position where even if the contact pressure from the protruding portion 33 is applied to a document, an oblique movement of the document does not occur. If this position is exemplified by a specific numerical value range, in a case where the full width of the document pressing member 19 in the width direction is taken as 100%, the position of the protruding portion 33 may be set within a central range of 10%, preferably, within a central range of 5%. However, these numerical value ranges can vary according to the contact pressure between the protruding portion 33 and a document. For this reason, it is preferable to optimize the position of the protruding portion 33 in view of the size of the protruding portion 33, the pressing force of the spring 20, and the like.

Also, according to the above described multi-function apparatus 1, the reading position P1 of the image sensor 23 is set to a position deviated in the document conveyance direction from a position where the protruding portion 33 comes into contact with a document. Therefore, the image sensor 23 can read the image of a document over the full width in the width direction, from a position where the contact pressure is not applied to the document. Therefore, it is possible to suppress unevenness in the color or density of the read image from occurring due to differences between the positions where the contact pressure from the protruding portion 33 is applied to the document and where the contact pressure from the protruding portion 33 is not applied to the document.

Also, according to the above described multi-function apparatus 1, if a frictional force acting between the document pressing member 19 and a document increases, the document pressing member 19 is lifted up. Therefore, it is possible to suppress the contact pressure acting on the document from becoming excessively large. Further, since the reading position P1 is closer to the rotation center than the protruding portion 33, even if the protruding portion 33 is lifted up to some extent, the document pressing member 19 is not displaced upwardly at the reading position P1, as compared a position where the protruding portion 33 is displaced.

Therefore, at the reading position P1, the interval between the document pressing member 19 and the platen glass 18 does not become excessively large. Therefore, as compared to a case where the reading position P1 is on the downstream side from the protruding portion 33 in the document conveyance direction, it is possible to suppress unevenness in the color or density of a read image from occurring.

Also, according to the above described multi-function apparatus 1, since the tip end of the protruding portion 33 in the protrusion direction protrudes by an amount such that it can come into contact with the platen glass 18, as compared to a case where the leading end protrudes by an amount such that it cannot come into contact with the platen glass 18, the dimension of the gap which is formed on both sides of the protruding portion 33 is stabilized. Therefore, it is possible to suppress unevenness in the colors or densities of images from occurring due to differences among apparatuses.

Further, according to the above described multi-function apparatus 1, since the document pressing member 19 has the guide surface 19A as described above, it is possible to smoothly guide the leading end of each document to the reading position P1.

[Other Embodiments]

Although the embodiment of this disclosure has been described, this disclosure is not limited to the above described specific embodiment, but can be implemented in various forms.

For example, although not mentioned in the above described embodiment, the document pressing member 19 may have a shape, in the width direction, such that the central portion is bent to be separated from the platen glass 18 than both end portions.

According to this configuration, even if the document pressing member 19 is slightly deformed between the spacers 31A and 31B provided on both ends of the document pressing member 19, it is possible to appropriately bring the spacers 31A and 31B into contact with the platen glass 18, and it is possible to form a gap between the document pressing member 19 and the platen glass 18.

Also, in a case where the spring 20 is applying a biasing force to the document pressing member 19 at the central portion of the document pressing member 19 in the width direction, the central portion is pressed against the platen glass 18. Even in this case, if the document pressing member 19 has a shape, in the width direction, such that the central portion is bent to be separated from the platen glass 18 than both end portions, it is possible to appropriately bring the spacers 31A and 31B, which are positioned on both end portions of the document pressing member 19 in the width direction, into contact with the platen glass 18.

What is claimed is:

1. An image reading apparatus comprising:
   a conveyor configured to convey a sheet along a predetermined conveyance path;
   a platen;
   a sheet pressing member, which has a shape extending in a width direction perpendicular to both of a sheet conveyance direction of the conveyor and a sheet thickness direction, and which is disposed at a position facing the platen, the conveyance path interposed between the sheet pressing member and the platen so that the sheet pressing member contacts the sheet conveyed by the conveyor when the sheet passes between the sheet pressing member and the platen;
   a biasing member configured to bias the sheet pressing member toward the platen; and
   a reading unit configured to read an image of the sheet at a predetermined reading position, through the platen, when the sheet conveyed by the conveyor passes between the platen and the sheet pressing member,
   wherein the sheet pressing member is made of a resin member,
   wherein each end portion of the sheet pressing member in the width direction is provided with a respective one of a plurality of spacers,
   wherein each of the spacers protrudes toward the platen, a tip end of the spacer in a protrusion direction of the spacer contacting the platen at positions outside of a reading range of the reading unit in the width direction to secure a gap between the sheet pressing member and the platen,
   wherein a protruding portion is provided on a central portion of the sheet pressing member in the width direction,
   wherein the sheet pressing member has a rotation axis positioned on an upstream side in the sheet conveyance direction, and the sheet pressing member is disposed in a manner thet a downstream side in the sheet conveyance direction is rotatable upwaedly with respect to the rotation axis, and
   wherhin the protruding portion is provided at a position deviated and downstream from, in the sheet conveyance direction, the reading position of the reading unit.

2. The image reading apparatus according to claim 1,
   wherein the protruding portion protrudes toward the platen, and
   wherein a tip end of the protruding portion contacts the sheet conveyed by the conveyor.

3. The image reading apparatus according to claim 1,
   wherein the protruding portion is provided at a position deviated from the reading position of the reading unit in the sheet conveyance direction.

4. The image reading apparatus according to claim 1,
   wherein, in a state where sheet conveyance is not being performed by the conveyor, the tip end of the protruding portion in the protrusion direction of the protruding portion contacts the platen.

5. The image reading apparatus according to claim 1,
   wherein the sheet pressing member has a guide surface, which guides a leading end of the sheet conveyed by the conveyor, to the reading position, when the leading end of the sheet comes into contact with an end portion of the sheet pressing member positioned on the upstream side in the sheet conveyance direction.

* * * * *